(12) United States Patent
Fritz et al.

(10) Patent No.: US 6,218,816 B1
(45) Date of Patent: Apr. 17, 2001

(54) POWER SUPPLY WITH CONTROL CIRCUIT FOR SHORT CIRCUIT DETECTION AND EXCESS CURRENT PROTECTION

(75) Inventors: Todd W. Fritz, Kalamazoo; Edward F. Handley, Portage, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/421,744

(22) Filed: Oct. 20, 1999

(51) Int. Cl.$^7$ ..................................... G05F 1/573
(52) U.S. Cl. ............................. 323/277; 361/18
(58) Field of Search .................... 323/276, 265, 323/273–275, 266, 901, 908; 361/18

(56) References Cited

U.S. PATENT DOCUMENTS

| | | | |
|---|---|---|---|
| 5,698,973 | * 12/1997 | Goerke et al. | 323/901 |
| 5,831,471 | * 11/1998 | Nakajima et al. | 327/540 |
| 5,986,902 | * 11/1999 | Brkovic et al. | 323/277 |

* cited by examiner

Primary Examiner—Peter S. Wong
Assistant Examiner—Gary L. Laxton
(74) Attorney, Agent, or Firm—Rader, Fishman & Grauer PLLC

(57) ABSTRACT

The present invention relates to an electronic control circuit that detects a short-circuit or excess current condition and, in response thereto, cuts off the output current from the system power supply. The circuit is disposed between a system power supply and a load device. An output transistor is connected between the system power supply and the load device to control the level of current supplied to the load device, including cutting off the current supply entirely in case of a short-circuit or excess current condition. The output transistor is controlled by a pre-drive transistor which, in combination with pre-drive resistors, provides a control signal to the output transistor to control the level of output current supplied to the load device. The control signal produced by the pre-drive transistor is dependent upon the output of an operational amplifier that compares the output potential to a pre-determined reference voltage to determine if the output potential has reached a stable level. In the event of a short-circuit or excess current condition, a switch network, consisting of a switch transistor, a resistor, and two diodes in the preferred embodiment, deactivates the pre-drive transistor, which in turn deactivates the output transistor. The output transistor cuts off the output current from the system power supply, thereby protecting the system power supply from possible damage.

19 Claims, 2 Drawing Sheets

POWER SUPPLY WITH CONTROL CIRCUIT FOR SHORT CIRCUIT DETECTION AND EXCESS CURRENT PROTECTION

TECHNICAL FIELD OF THE INVENTION

The present invention relates to an electronic circuit that protects a system power supply from potential damage from a short-circuit or excess current situation. In particular, the present invention prevents the system power supply from "powering up" the system if it is in a short-circuit situation. The present invention also detects short-circuit and excess current situations after the system has been "powered up", and, in such circumstances, cuts the system power supply off from the rest of the system to prevent possible damage to the power supply from excessive output current.

BACKGROUND

Power supplies in electronic systems, such as automobile electrical systems, are subject to potential damage if a short-circuit or an excess current condition occurs. Present technology protects system power supplies by using active current sensors to determine if excess current is drawn from the power supply. Other existing technology involves the use of heat sensing devices to determine if the load device in the system or the pass transistor in the power supply is conducting excessive heat. If excess current or excess heat is detected in the system, the electrical system is shut down prior to the power supply incurring any damage. However, the use of active current sensors and heat sensing devices is not as cost effective as using individual electronic components. Moreover, the use of active current sensors and heat sensing devices requires complex methodologies to compensate for general temperature variations which are not as efficient as the present invention. Accordingly, there exists a need for an electronic control circuit that protects the system power supply from short-circuit or excess current conditions without requiring the use of an active current sensing device or heat sensing device.

SUMMARY OF THE INVENTION

The present invention is directed to an electronic circuit that protects a system power supply from being potentially damaged by short-circuit or excessive current situations. The electronic circuit is disposed between the system power supply and the load device to which the system power supply is intended to provide power. Though the load device can be any type of device that requires power from a system power supply, the preferred embodiment of this invention assumes that the load device is part of an automobile system, and the power supply is the automobile's 12-volt battery.

The electronic circuit includes a switch network which initially determines if a load device is connected to the circuit and whether a short-circuit or excess current condition exists. If there is no short-circuit or excess current condition, the switch network permits the system to "power up". If a short-circuit or excess current condition does exist, the switch network prevents the system power supply from providing power to the system. Thus, the system power supply is protected from possible damage from the short-circuit or excess current condition.

The electronic circuit also includes an output current control circuit for controlling the current provided from the power supply during normal operation and for cutting off the power supply if a short-circuit or excess current condition is detected during operation. In the preferred embodiment, the output current control circuit includes a bi-polar junction output transistor connected between the system power supply and the load device. The output current of the output transistor depends upon a drive current control signal, which is the output of a drive current control circuit. Preferably, the drive current control circuit includes a pre-drive transistor, which controls the input current to the base of the output transistor, which in turn dictates the output current supplied to the load device.

During normal operation (i.e., when there is no short-circuit or excess current condition), the pre-drive transistor determines a stable level of output current to deliver to the load device by receiving feedback from the output transistor. It is generally preferred that the output voltage across the load device be compared to a pre-determined reference voltage by an operational amplifier. The output of the operational amplifier provides the feedback to and activates the pre-drive transistor. As the output voltage across the load device approaches the pre-determined reference voltage, the currents through the pre-drive transistor and the output transistor decrease until the output voltage stabilizes.

If a short-circuit or excess current situation occurs, the drive current control signal deactivates the output transistor, cutting off all current flow to the load device. The output transistor remains deactivated until the short-circuit or excess current situation is eliminated, at which time, the switch network reactivates the circuit.

DETAILED DESCRIPTION OF THE PREFERRED EMBODIMENT

Figure 1:
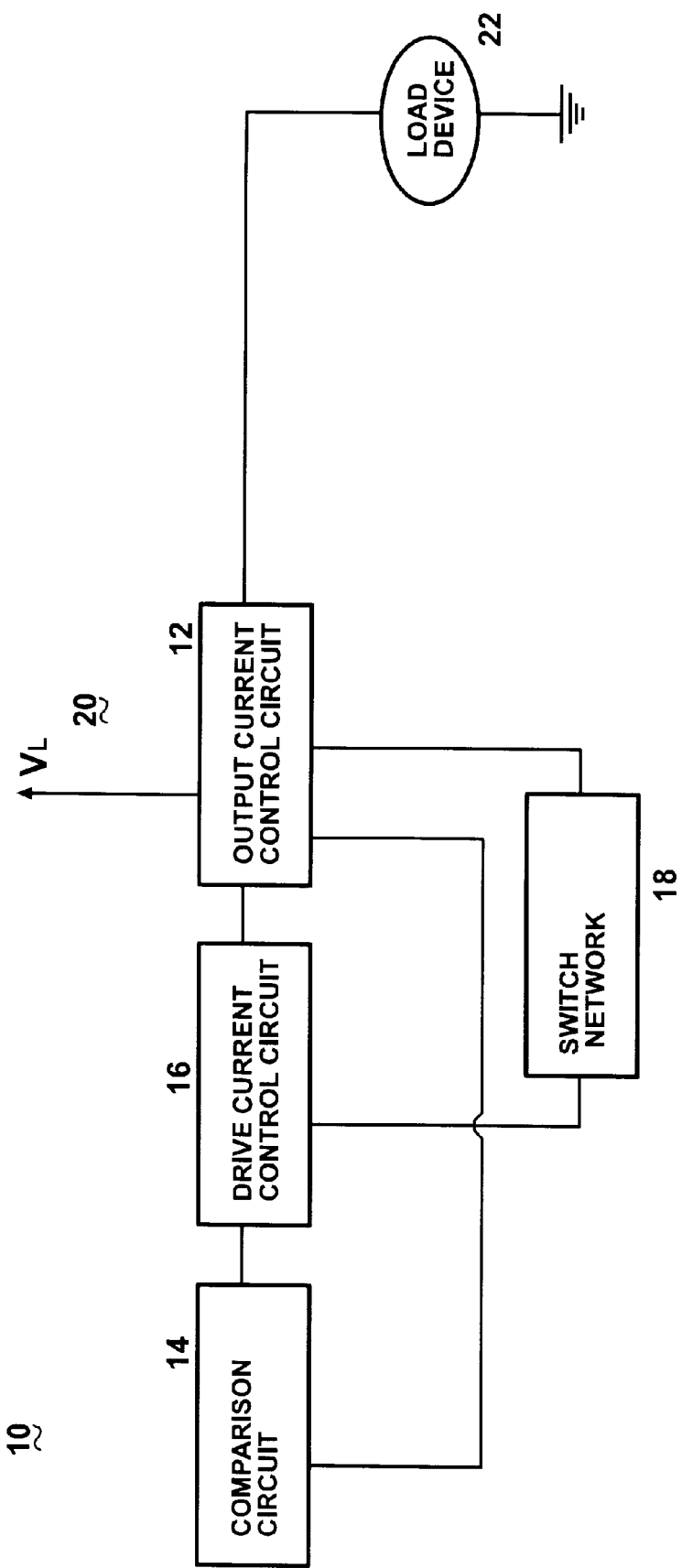
FIG. 1 shows a blocked diagram of the circuit according to a preferred embodiment of the present invention.

With reference to FIG. 1, a control circuit 10 according to a preferred embodiment of the invention comprises a system power supply 20; an output current control circuit 12 connected between said power supply and a load device 22 for controlling the level of output current supplied to the load device 22; a comparison circuit 14 for comparing the voltage across the load device with a pre-determined reference voltage to provide a voltage stabilization control signal; a drive current control circuit 16 responsive to the stabilization control signal for providing a drive current control signal to the output current control circuit 12; and a switch network 18 connected to the drive current control circuit 16 to selectively activate the control circuit 10. In the disclosed embodiment, it is assumed that the system power supply 20 is a common automobile 12-volt battery. Though the device load 22 can be any device that imposes a load on the system, it is assumed that the device load 22 in the preferred embodiment is a load device found in an automobile system.

Figure 2:
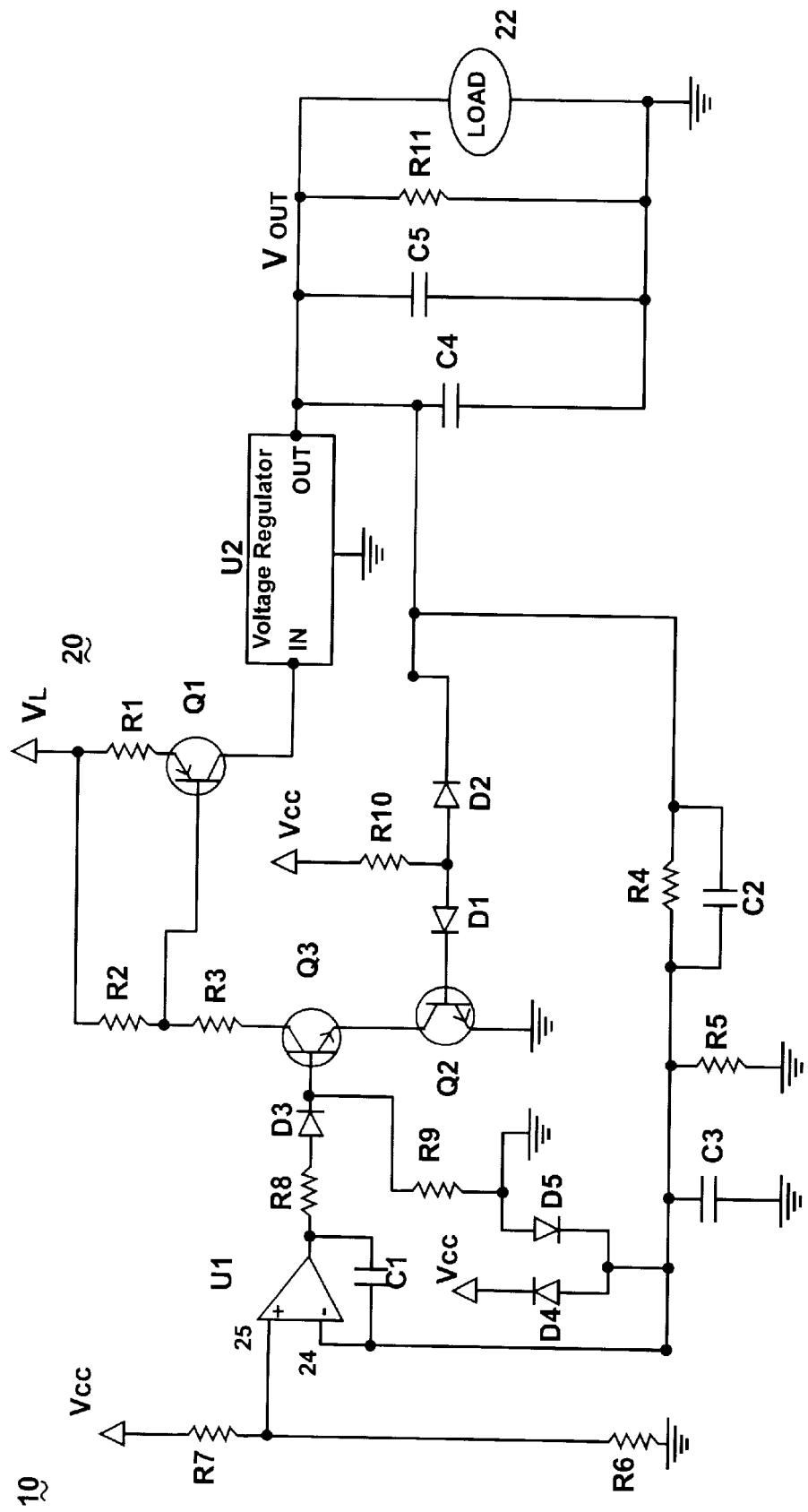
FIG. 2 shows a schematic of the circuit according to a preferred embodiment of the present invention.

Referring to FIG. 2, which shows circuit 10 in detail, power supply 20 provides output current to device load 22 through resistor R1 and output transistor Q1, which together comprise the output current control circuit 12. The output potential Vout across the device load 22 is scaled by voltage divider R4 and R5. A reference voltage Vcc is scaled by voltage divider R6 and R7. The scaled output voltage Vout and the scaled reference voltage Vcc comprise the inverting 24 and non-inverting 25 inputs, respectively, to operational amplifier U1. Together, the R4/R5 voltage divider, the R6/R7 voltage divider, and operation amplifier U1 comprise the comparison circuit 14.

The output of U1 provides current to the base terminal of pre-drive transistor Q3. The collector terminal of Q3 is connected to resistor R3, which is connected to resistor R2, which is connected to the power supply 20. The potential at the R2/R3 node provides the input to the base terminal of Q1. R2, R3, and Q3 comprise the drive current control circuit 16. Q1 comprises the output current control circuit 12.

The switch network 18 comprises resistor R10, diodes D1 and D2, and switch transistor Q2. The emitter terminal of Q3 is connected to the collector terminal of switch transistor Q2, and the emitter terminal of Q2 is connected to ground. Vcc provides current through resistor R10 and diode D1 to the base terminal of Q2. Vcc is also connected through R10 and diode D2 to the Vout node.

When a short-circuit or excess current condition exists at the load device 22, the switch network 18 passes bias current from Vcc through R10 and D2 because the Vout potential is close to zero. During this condition, Q2 is inactive because there is insufficient current being delivered to the base of Q2 to activate it. Accordingly, Q2 cuts off the path to ground from Q3, which essentially makes the control circuit 10 inactive and cuts off the system power supply 20 from the load device 22. Accordingly, the control circuit 10 is prevented from "powering up" if there is a short-circuit or excess current condition.

When a load device 22 is included in the circuit that provides sufficient resistance to reduce the load current and increase the Vout potential to a level greater than two diode junction voltage drops (D1 and the emitter of Q2), Q2 is activated, providing a current flow path from Q3 to ground. Q3's collector current is delivered from $V_L$ through R2 and R3. As a result, a drive current is delivered to the base of Q1, which causes output current to be delivered to the load device 22 and Vout to increase.

The rising potential at the Vout node is scaled by the R4/R5 voltage divider. In the preferred embodiment, R4 and R5 are of equal magnitudes so as to scale Vout by one half. Similarly, the Vcc potential is scaled by the R6/R7 voltage divider. In the preferred embodiment, R6 and R7 are of equal magnitudes so as to scale Vcc by one half. The difference between the scaled Vcc and Vout potentials comprises the input to U1. The amplified difference is applied to the base of Q3. The current supplied to the base of Q3 controls the current drawn by the collector of Q3 and thus the voltage drops across R2 and R3. The potential at the R2/R3 node controls the activation of Q1. As current is supplied to the load device 22 and the Vout potential increases, the difference voltage input to U1 decreases. As a result, Q3's emitter current decreases until a stable Vout potential is established. In the preferred embodiment, the stable Vout potential is approximately 5 volts. After a stable Vout is achieved, the system operates in steady state until a short-circuit or excess current condition is detected.

When a short-circuit or excess current condition occurs at the load device 22, the control circuit 10 shuts down and cuts the system power supply 20 off from the short-circuit or excess current condition. In such a situation, the short-circuit or excess current condition at the load causes the current pushed through R1 to increase and the voltage drop across R1 to increase. This removes potential for bias current from Q3. As Q3's collector current decreases, the potential at the R2/R3 node decreases, driving Q1 into cutoff. As cutoff is approached, Q1's emitter current is reduced, and the Vout potential approaches zero. As the Vout potential decreases, current from Vcc is drawn away from the base of Q2 until Q2 is deactivated. Once the short-circuit or excess current condition is eliminated, the switch network 18 reactivates the control circuit 10, as described above.

In a preferred embodiment of the invention, additional components are included in the control circuit 10 for such things as temperature compensation, device gain variances, general circuit stabilization, and protection against short circuits to high voltage or reverse polarity. Specifically, linear three-terminal voltage regulator U2 is connected between the collector of Q1 and the Vout node. U2 provides a high precision output voltage and closely regulates Vout to a stable voltage while maintaining the short-circuit and over-current protection features of the invention. R11 is connected in parallel with load device 22 to stabilize the circuit by dampening any overshooting of the 5-volt stabilized Vout potential on initial power-up of the control circuit 10. C4 and C5 are also connected in parallel with load device 22 and R11 to prevent the control circuit 10 from oscillating as a result of the high gain in the system. C3 is connected between the inverting input node of U1 and ground, and it acts as a filter against negative input to the system. D3 is connected between R8 and the base terminal of Q3 and prevents back leakage from the collector of Q3 when Q2 cuts off. The base terminal of Q3 is connected to reference ground through resistor R9, and R9 acts as an emitter follower to stabilize potential gain at high temperatures. D4 is connected between the inverting input to U1 and Vcc to clamp the Vout potential at its stable voltage and prevent damage from electrostatic discharge. D5 is connected between the inverting input of U1 and R9, providing a flow path from the base of transistor Q3 to the inverting input node 24 and preventing back leakage. Diode D5 also prevents the bias on inverting input node 24 from exceeding one diode drop below ground. A capacitor C1 is connected across U1's inverting input 24 and U1's output terminal, and C2 is connected in parallel with R4. C1 and C2 maintain a stable circuit by reducing oscillations.

While preferred embodiments of this invention has been described herein, it is apparent that the basic construction can be altered to provide other embodiments which utilize the processes and compositions of this invention. Therefore, it will be appreciated that the scope of this invention is to be defined by the claims appended hereto rather than by the specific embodiment which has been presented hereinbefore by way of example.

What is claimed is:

1. An electronic power supply control circuit for controlling power supplied from a system power supply to a load device, comprising:

an output current control means connected between the system power supply and the load device for controlling the level of output current supplied to the load device;

a comparing means for comparing a voltage across the load device with a pre-determined reference voltage to provide a voltage stabilization control signal;

a drive current control signal means responsive to said voltage stabilization control signal for providing a drive current control signal to said output current control means; and a switch network connected to said means for providing a drive current control signal to selectively activate the power supply control circuit only when the load device does not draw current that exceeds a predetermined level.

2. The control circuit of claim 1, wherein said means for providing a drive current control signal comprises a pre-drive transistor.

3. The control circuit of claim 2, wherein said means for providing a drive current control signal further comprises first and second pre-drive resistors connected in series between said pre-drive transistor and said system power supply.

4. The control circuit of claim 2, wherein said output current control means comprises an output transistor.

5. The control circuit of claim 2, wherein said comparing means comprises:
    an operational amplifier having two inputs and an output, and having its output connected to said pre-drive transistor.

6. The control circuit of claim 5, wherein said comparing means further comprises:
    a first voltage divider circuit connected between said output current control means and a ground reference, and the output of said first voltage divider circuit connected to one of said inputs to said operational amplifier; and
    a second voltage divider circuit connected between a reference power supply and a ground reference, and the output of said second voltage divider circuit connected to the other of said inputs to said operational amplifier.

7. The control circuit of claim 2, wherein said switch network comprises:
    a switch transistor connected between said means for providing a drive current control signal and a ground reference;
    a first diode connected between said switch transistor and a logic power supply; and
    a second diode connected between said logic power supply and said load device.

8. The control circuit of claim 1, wherein said output current control means comprises an output transistor.

9. The control circuit of claim 8, wherein said output current control means further comprises an output resistor connected in series between said power supply and said output transistor.

10. The control circuit of claim 1, wherein said switch network comprises:
    a switch transistor connected between said means for providing a drive current control signal and a ground reference;
    a first diode connected between said switch transistor and a logic power supply; and
    a second diode connected between said logic power supply and said load device.

11. An electronic power supply control circuit for controlling power supplied from a system power supply to a load device, comprising:
    an output transistor responsive to a drive current control signal and connected between the system power supply and the load device to provide output current from the system power supply to the load device when said output transistor is activated by said drive current control signal;
    a comparison circuit to compare voltage across the load device with a pre-determined reference voltage and provide a voltage stabilization control signal;
    a pre-drive transistor responsive to said voltage stabilization control signal to provide said drive current control signal to said output transistor; and
    a switch network connected between said pre-drive transistor and said output transistor to selectively activate said pre-drive transistor only when the load device does not draw current that exceeds a predetermined level.

12. The control circuit in claim 11, further comprising:
    first and second pre-drive resistors connected in series between said pre-drive transistor and said system power supply;
    an output resistor connected between said system power supply and said output transistor.

13. The control circuit of claim 12, wherein said switch circuit comprises:
    a switch transistor connected between said means for providing a drive current control signal and a ground reference;
    a first diode connected between said switch transistor and a logic power supply; and
    a second diode connected between said logic power supply and the load device.

14. The control circuit of claim 13, wherein said comparison circuit comprises:
    an operational amplifier having two inputs and an output, and having its output connected to said pre-drive transistor.

15. The control circuit of claim 14, wherein said comparison circuit further comprises:
    a first voltage divider circuit connected between said drive current control means and a ground reference, and the output of said first voltage divider circuit connected to one of said inputs to said operational amplifier; and
    a second voltage divider circuit connected between a logic power supply and a ground reference, and the output of said second voltage divider circuit connected to said other of said inputs to said operational amplifier.

16. A method for supplying power to a load device from a system power supply while protecting the system power supply from a short-circuit or excess current condition, comprising the steps of:
    determining if the load device is connected to the system power supply;
    if the load device is connected, then activating a switch transistor to provide an open current path from a pre-drive transistor to a ground reference;
    providing a voltage stabilization control signal to said pre-drive transistor;
    providing a drive current control signal and selectively activating an output transistor to control the level of output current supplied to the load device;
    deactivating said output transistor if a short-circuit or excess current condition is detected at the load device.

17. The method of claim 16, wherein said step of providing a voltage stabilization control signal to said pre-drive transistor comprises comparing the voltage across the load device to a pre-determined reference voltage.

18. An electronic power supply control circuit for controlling power supplied from a system power supply to a load device, comprising:
    a switch network connected to the system power supply to selectively activate the power supply control circuit; and
    wherein said switch network comprises:
        a switch transistor connected between said system power supply and a ground reference;
        a first diode connected between said switch transistor and a logic power supply; and a second diode connected between said logic power supply and the load device.

19. An electronic power supply control circuit for controlling power supplied from a system power supply to a load device, comprising:
- an output current control means connected between the system power supply and the load device for controlling the level of output current supplied to the load device;
- a comparing means for comparing a voltage across the load device with a pre-determined reference voltage to provide a voltage stabilization control signal;
- a drive current control signal means responsive to said voltage stabilization control signal for providing a drive current control signal to said output current control means;
- a switch network connected to said means for providing a drive current control signal to selectively activate the power supply control circuit; and wherein said switch network comprises:
- a switch transistor connected between said means for providing a drive current control signal and a ground reference;
- a first diode connected between said switch transistor and a logic power supply; and
- a second diode connected between said logic power supply and said load device.

* * * * *